United States Patent Office 3,222,288
Patented Dec. 7, 1965

3,222,288
PROCESS FOR PREPARING SODIUM HYDRIDE
Virgil L. Hansley, Cincinnati, and Fred Keith Morgan, North College Hill, Ohio, assignors to National Distillers and Chemical Corporation, New York, N.Y., a corporation of Virginia
No Drawing. Filed Dec. 12, 1960, Ser. No. 75,136
8 Claims. (Cl. 252—182)

The present invention relates to a method for preparation of alkali metal hydrides and, more particularly, for preparation of such hydrides by reaction between an alkali metal and hydrogen in the presence of a defined amount of a selected dispersing agent.

Alkali metal hydrides such as sodium hydride are generally prepared by the direct hydrogenation of an alkali metal at an elevated temperature. At usual reaction temperatures, however, sodium hydride is a solid which coats the metallic sodium and makes the absorption of hydrogen incomplete unless special means are employed to disperse the liquid sodium. Freudenberg et al., U.S. Patent 1,796,265, mix a molten alkali metal with a finely divided solid inert material and then react the mixture with hydrogen at an elevated temperature. Hansley, U.S. Patent Nos. 2,372,670, 2,372,671, and 2,504,927, discloses various dispersing or surface active agents which, when added to the reaction mixture, materially increase the reaction rate. These agents include materials, such as fatty acids with more than 8 carbon atoms and salts thereof, various alkali metal hydrocarbides and hydrocarbons capable of reacting with alkali metals to form hydrocarbides, and acetylenic hydrocarbons and reaction products of an alkali metal and acetylenic hydrocarbons.

It is one object of this invention to provide an improved process for the preparation of alkali metal hydrides such as sodium hydride by reacting an alkali metal with hydrogen. It is another object to provide a process for the preparation of finely dispersed alkali metal hydrides having average particle sizes between about one micron and about ten microns. Additional objects will be apparent from the ensuing description.

This invention is based upon the discovery that certain selected organic compounds of elements of Group IV$a$ and Group IV$b$ of the Periodic Table, when added in relatively small amounts, are highly effective as dispersants in the preparation of alkali metal hydride dispersions of extremely fine particle size, i.e., about one to about ten microns, by hydrogenating alkali metal dispersions. These Group IV elements include silicon, titanium, zirconium, hafnium, germanium, tin, and lead.

In general, amounts of from about 0.5 to about 2.5 percent, based on the weight of the alkali metal, are sufficient to give excellent results. Concentrations below about 0.5 percent or above about 2.5 percent, for example, up to about ten percent, are operable but are generally not used because of too severe contamination of the resulting alkali metal hydride dispersion.

The dispersant of this invention can be added at any desired stage during the process. It is preferably added to the alkali metal in an inert liquid prior to the hydrogenation operation; however, it also can be added during the formation of the alkali metal hydride.

A variety of organic compounds of elements of Group IV of the Periodic Table are suitable for practice of this invention. Examples of these include triethyl silicol, n-propyl silicol, silyl ethers such as $(CH_3)_3SiOSi(CH_3)_3$, and, especially, the ortho esters such as methyl silicate, ethyl silicate, butyl silicate, butyl titanate, tetraphenyl titanate, dimethyl dimethoxy silane, mixed esters such as $TiCl_3(OC_6H_5)$ and $C_6H_5Ti(OPr)_3$, and the like, and mixtures thereof. Organic compounds of other elements of Group IV of the Periodic Table, such as zirconium, hafnium, lead, and tin, may also be used.

The alkali metal hydride may be prepared by any of several methods known to the art for the hydrogenation of the appropriate alkali metal as long as, as embodied herein, there is present during the hydrogenation the aforesaid proportional amount of the specific selected dispersing agent.

The preparation of the alkali metal hydride dispersion is suitably carried out in an inert liquid such as, preferably, a liquid hydrocarbon, although other inert, liquid substances such as ethers, tertiary amines, and the like may be used. Specific examples of such inert liquids include pentane, heptane, toluene, mineral spirits, mineral oils, decalin, kerosenes, butyl ether, tetrahydrofuran, diethyl ether of ethylene glycol, n-methylmorpholine, dimethylaniline, and so forth, and mixtures thereof. In general, the alkali metal is employed in an amount up to about 30 percent by weight of the inert medium, the preferred amount being from about 8 to about 22 percent. Concentrations above about 30 percent, although operable, are generally not used because the paste-like consistency of the dispersion so prepared makes handling difficult.

The hydrogenation reaction usually is carried out with moderate agitation, i.e., about 800 r.p.m., at a hydrogen pressure of about 200 to about 1000 p.s.i., 300 to 500 p.s.i. being preferred. The reaction temperature employed is from about 200 up to about 400° C., with a preferred temperature being from about 250° up to about 350° C.

Although the process of this invention will be described in relation to making fine dispersions of sodium hydride, it will be understood that the process is equally suitable for making finely dispersed hydrides of other alkali metals, i.e., potassium, lithium, cesium, rubidium, and mixtures of alkali metals.

Dispersions of alkali metal hydrides prepared in accordance with the process of this invention have an average particle size of less than about ten microns and generally have particle sizes in the range of about one to about five microns. Such finely dispersed alkali metal hydrides are particularly useful as catalysts for olefin polymerizations; anhydrous alkali condensations; and transesterification of fat structure of glycerides; as chemical intermediates, particularly in pharmaceutical preparations, as for example the preparation of barbiturates; and the like.

The dispersed alkali metal hydride may be separated from the dispersant liquid by filtration and/or settling and may be isolated as a finely divided white powder. In such a state, however, the hydride is very pyrophoric in contact with the air.

In order to illustrate the invention, but without intent of limitation, the following embodiments are set forth. Unless otherwise specified, all parts are given by weight.

EXAMPLE 1

100 parts of sodium in approximately 1″ cubes and 1000 parts of a white mineral oil were charged to an autoclave equipped with a turbine-type impeller. Ethyl silicate, 0.1 part, was injected below the surface of the mineral oil. The system was flushed with hydrogen, sealed, and heated to 338° C. Hydrogen was admitted to a pressure of 250 p.s.i., and stirring was commenced at a rate of about 800 r.p.m. Active hydrogen absorption took place for about 15 minutes, and stirring was continued for an additional hour at reaction temperature. The resulting dispersion of sodium hydride was allowed to cool to room temperature. It was analyzed for sodium hydride by measuring the hydrogen released upon treatment with water and by measuring the alkali associated with the hydrogen evolved. This material was 93.1 percent NaH and 6.9 percent NaH₃, with not free sodium. This higher than theory hydrogen for NaH is interpreted to be "solid solution" hydrogen in NaH. It had an average partical size of les than one micron.

The procedure of Example 1 was repeated, using varying quantities of ethyl silicate and using other dispersing agents temperatures, pressures, reaction media, and sodium concentrations in reaction media (Examples 2 to 9). Example 10 is included for purposes of comparison to show the improved particle sizes obtained by using the dispersing agents as embodied herein in contrast to that obtained when no dispersant was used. Results are tabulated below.

40° C. When the addition of dimethylaluminum chloride was complete, the mixture was stirred for an additional period of time to allow completion of reaction. The product was distilled under 1 mm. vacuum to provide a distallate comprising dimethylaluminum hydride and a trace of unreacted dimethylaluminum chloride. The resulting distillate was then analyzed for chloride content by injecting a sample into a stoppered, argon-blanketed, tarred flask containing mineral oil, treating the resulting mixture with water, and analyzing the aqueous phase for chloride ion by conventional methods. To obtain the substantially pure dimethylaluminum hydride, the distillate was stirred for several minutes with an excess of sodium hydride and the product was redistilled.

*Table I*

DISPERSANTS IN THE SODIUM HYDRIDE FORMATION REACTION

| Example | Dispersant | Amt., percent [1] | Medium | Na Concn., percent | Pressure, p.s.i. | Temp., max., °C. | Sodium analysis as— | | | Particle size, microns, average |
|---|---|---|---|---|---|---|---|---|---|---|
| | | | | | | | NaH | NaH₃ | Free Na | |
| 1 | Ethyl silicate | 1.0 | Mineral oil | 10 | 250 | 338 | 93.1 | 6.9 | 0 | <1 |
| 2 | ___do___ | 2.0 | Nujol [2] | 8.7 | 498 | 250 | 98.4 | 0 | 1.6 | <2 |
| 3 | Methyl silicate | 1.0 | Mineral oil | 10 | 200 | 299 | 94.4 | 0 | 5.6 | <5 |
| 4 | ___do___ | 1.0 | ___do___ | 20 | 500 | 338 | 95.8 | 4.2 | 0 | <7 |
| 5 | Butyl silicate | 3.0 | Nujol [2] | 9.1 | 503 | 252 | 82.8 | | 17.2 | <2 |
| 6 | Butyl titanate | 1.0 | Mineral oil | 20 | 213 | 350 | 89.7 | 10.3 | 0 | <10 |
| 7 | ___do___ | 2.0 | Nujol [2] | 10.4 | 493 | 260 | 91.1 | 8.9 | 0 | <10 |
| 8 | ___do___ | 5.5 | ___do___ | 11.4 | 510 | 280 | 97.5 | 2.5 | 0 | <10 |
| 9 | ___do___ | 5.0 | Heptane | 18.0 | 505 | 210 | 99.0 | 1.0 | 0 | <10 |
| 10 | None | | Mineral oil | 10 | 200 | 321 | 99.3 | 0.7 | 0 | >20 |

[1] Based on sodium.
[2] A trade name for a heavy medicinal paraffin oil.

*Table II*

| Ex. | Dimethyl-aluminum chloride, moles | NaH in mineral oil | | Dispersant | Amt., percent [1] | Yield of total product as percent Me₂AlH |
|---|---|---|---|---|---|---|
| | | NaH, moles | NaH, percent | | | |
| 11 | 3.95 | 3.95 | 15.2 | Ethyl silicate | 1.0 | 84.0 |
| 12 | 1.0 | 1.1 | 8.2 | None | | 15.0 |

[1] Based on sodium.

The advantages of using finely dispersed sodium hydride instead of coarser conventional sodium hydride are demonstrated by the following examples wherein dimethylaluminum hydride is prepared by reaction between dimethylaluminum chloride and sodium hydride. Example 12 was run using conventional sodium hydride having an average particle size of over twenty microns and is included for purposes of comparison to show how the use of finely dispersed sodium hydride (Example 11) results in improved yields of dimethylaluminum hydride.

EXAMPLE 11

To a 15 percent suspension of sodium in a white mineral oil was added 1.0 percent of ethyl silicate (based on sodium). The mixture was heated to 250 C. Hydrogen was then passed into the stirred mixture at 250 p.s.i. at a rate sufficient to maintain the reaction under control and until no further hydrogen absorption occurred. The temperature was then lowered. While the resulting hydride in mineral oil was stirred in an argon-blanketed flask, dimethylaluminum chloride was added at a rate sufficient to maintain the desired reaction temperature of 40° C.

The utilization of finely dispersed sodium hydride, made in accordance with the process of this invention, in the preparation of sodium methoxy borohydride is demonstrated in the following examples, Example 14 having been included for purposes of comparison.

EXAMPLE 13

A dispersion of sodium hydride was prepared according to the process of Example 1, using heptane as the reaction medium and butyl titanate, 0.5 weight percent based on sodium, as the dispersant. To 48 parts of this dispersion of sodium hydride in heptane was added 215 parts of methyl orthoborate B(OCH₃)₃ over a period of two hours with stirring at a temperature of 150–160° C. under the autogenous pressure of the heptane in an autoclave. Sodium trimethoxy borohydride

NaHB(OCH₃)₃ formed as a course white precipitate, and heptane and unchanged orthoboric ester were removed in a vacuum.

The yield of sodium trimethoxy borohydride was 243.6 parts (theory 256 parts).

EXAMPLE 14

The procedure of Example 13 was followed, except that the sodium hydride employed was conventional, having an average particle size of over twenty microns. In order to convert the methyl orthoborate to sodium trimethoxy borohydride, a temperature of 250–300° C. was required. At this temperature range considerable disproportionation of the sodium trimethoxy borohydride to $NaBH_4$ and $B(OCH_3)_3$ occurred.

While there are above disclosed but a limited number of embodiments of the process of the invention herein presented, it is possible to produce still other embodiments without departing from the inventive concept herein disclosed, and it is desired therefore that only such limitations be imposed upon the appended claims as are stated therein.

What is claimed is:

1. In a process for preparing a sodium hydride dispersion by hydrogenation of sodium in an inert liquid reaction medium the improvement which comprises carrying out such hydrogenation in the presence of from about 0.5 to about 10% by weight, based on the sodium, of an organic compound selected from the group consisting of ethyl silicate, methyl silicate, butyl silicate, and butyl titanate to obtain a sodium hydride product having an average particle size of less than 10 microns.

2. The process of claim 1 wherein the amount of the organic compound ranges from about 0.5 to about 2.5% by weight, based on the weight of the sodium.

3. The process of claim 1 wherein said organic compound is ethyl silicate.

4. The process of claim 1 wherein said organic compound is methyl silicate.

5. The process of claim 1 wherein said organic compound is butyl silicate.

6. The process of claim 1 wherein said organic compound is butyl titanate.

7. In a process for preparing sodium hydride by hydrogenation of sodium in an inert hydrocarbon liquid, the improvement which comprises carrying out said hydrogenation in the presence of 0.5 to about 2.5% by weight, based on the sodium, of ethyl silicate to obtain sodium hydride having an average particle size between about 1 micron and about 10 microns.

8. The process of claim 7 wherein said hydrogenation is carried out at a temperature within the range of about 200° to 400° C. and at a pressure of about 200 to 1000 p.s.i.

References Cited by the Examiner

UNITED STATES PATENTS

| | | | |
|---|---|---|---|
| 2,566,365 | 9/1951 | Pedlow et al. | 252—49.6 XR |
| 2,720,444 | 10/1955 | Banus et al. | 23—204 XR |
| 2,910,441 | 10/1959 | Dusseldorf | 252—351 |
| 2,915,542 | 12/1959 | Robinson et al. | 23—204 XR |
| 2,990,377 | 6/1961 | May | 252—351 XR |
| 3,110,601 | 11/1963 | Emblem | 252—351 XR |
| 3,116,112 | 12/1963 | Jenkner | 23—404 |
| 3,119,852 | 1/1964 | Gilsdorf | 260—429.5 |

OTHER REFERENCES

"Metal-Organic Compounds," published September 1959 by the American Chemical Society, pages 217–224, 272–88.

JULIUS GREENWALD, *Primary Examiner.*

MAURICE A. BRINDISI, *Examiner.*